United States Patent

[11] 3,539,043

| [72] | Inventor | Raymond E. Brochetti |
| | | 52 Sherman Ave., Chicopee, Massachusetts 01013 |
| [21] | Appl. No. | 764,151 |
| [22] | Filed | Oct. 1, 1968 |
| [45] | Patented | Nov. 10, 1970 |

[54] OVERLOAD RELEASED FRICTION CLUTCH
10 Claims, 10 Drawing Figs.

[52] U.S. Cl.......... 192/56,
192/65, 192/93, 192/94, 192/150
[51] Int. Cl. .................................. F16d 43/20
[50] Field of Search................. 192/56(last shoe), 56, 65, 94

[56] References Cited
UNITED STATES PATENTS
3,254,353  6/1966  Johnson .............. 192/56
3,282,387  11/1966  Becker et al............. 192/56

Primary Examiner—Benjamin W. Wyche
Attorney—Brown, Critchlow, Flick & Peckham

ABSTRACT: A drive member and a driven member normally are operatively connected together by a friction coupling maintained in operative position by threaded means connected with the driven member in such a manner that the threaded means is stopped from rotating, at least temporarily, if the driven member is stalled. The direction of the screw threads is so related to the direction of rotation of the drive member that is the drive member is stalled the drive member will start to back the threaded means away from the friction coupling and thereby release it.

INVENTOR.
RAYMOND E. BROCHETTI

INVENTOR.
RAYMOND E. BROCHETTI
BY
Brown, Critchlow, Flick & Peckham
ATTORNEYS.

Patented Nov. 10, 1970

INVENTOR.
RAYMOND E. BROCHETTI
BY
Brown, Critchlow, Flick & Peckham
ATTORNEYS.

OVERLOAD RELEASED FRICTION CLUTCH

It is among the objects of this invention to provide a coupling, in which the drive member will automatically be released from the driven member in case the latter is stalled or subjected to excessive overloading, and in which unloading of the drive member automatically shuts off the driving motor.

The invention is illustrated in the accompanying drawings, in which

Figure 1:
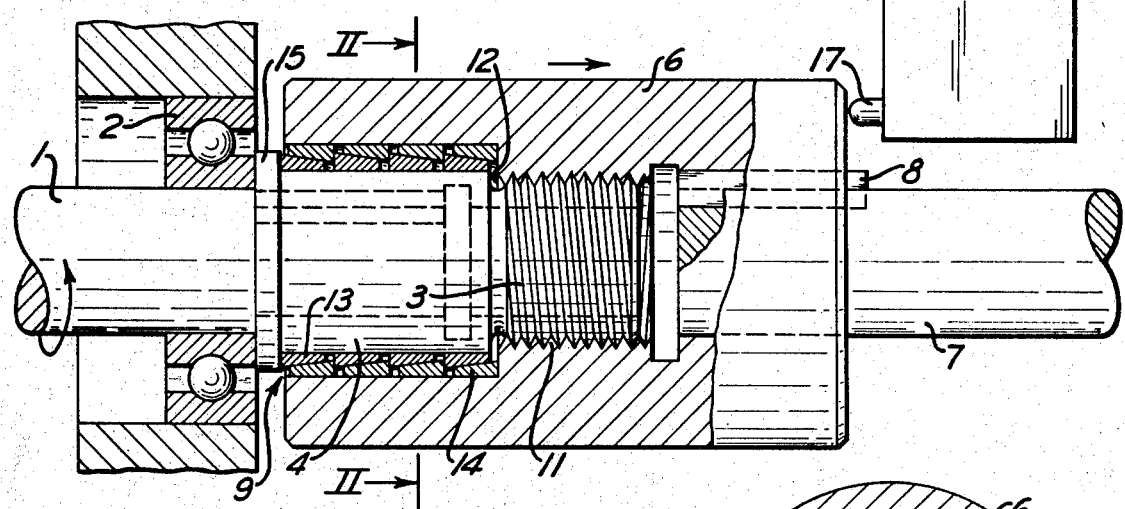
FIG. 1 is a side view, mostly in section, of my automatic unloading coupling.
Figure 2:
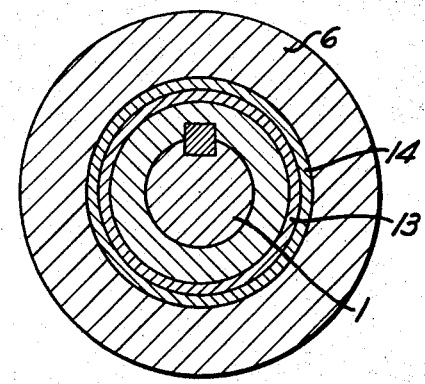
FIG. 2 is a cross section taken on the line II–II of FIG. 1.

Referring to FIGS. 1 and 2 of the drawings, a drive member or shaft 1 in a bearing 2 is driven by a suitable source of power, such as a motor (not shown). The shaft is provided with a screw threaded portion 3, preferably at its end, and an adjacent smooth area 4 that generally will be cylindrical although it could be tapered. The threaded portion and smooth area may be integral parts of the shaft, or as shown, a hollow shaft extension in which the shaft proper is keyed. Encircling smooth area 4 and spaced therefrom is a concentric driven member, which may be in the form of a hub or sleeve 6 that may extend out past the end of the shaft. The outer end portion of the sleeve is formed for connection to the element that it is to turn. Thus, a driven shaft 7 may be inserted in the outer end of the sleeve and compelled by a spline 8 to rotate with the sleeve. The annular space between the inner surface of the sleeve and the encircled smooth end of the drive shaft contains a friction coupling 9 that normally connects the sleeve and shaft together so that they can rotate as a unit.

The illustrated friction coupling is formed to exert pressure both radially inward and outward when pressure is applied axially to its opposite ends. Such axial pressure is applied by threaded means screwed onto the outer end of the drive shaft. In the case of sleeve 6, the threaded means 11 is integral with it, the threaded area being separated from the cylindrical area encircling the friction coupling by means of a radial shoulder 12. The only disadvantage of having the threaded and cylindrical areas of the sleeve joined to each other is that when the sleeve is screwed onto the drive shaft the portion of the sleeve around the friction coupling must turn also. The friction coupling most suitably is formed from several pairs of concentric rings encircling the drive shaft inside the sleeve, the inner surfaces of the inner rings 13 and the outer surfaces of the outer rings 14 being cylindrical and engaging the shaft and sleeve, respectively. The engaging surfaces of the rings in each pair are tapered lengthwise of the sleeve. All of the inner rings are spaced apart, and the same is true of all of the outer rings, but the thick end of one ring in each concentric pair engages the thick end of a ring in the next pair. The ring at one end of the outer row of rings engages the sleeve shoulder 12, which is the inner end of the threaded means 11, and the ring at the opposite end of the other row engages a shoulder 15 on the drive shaft. The rings can be thin enough and elastic enough for the outer rings to be expanded slightly by internal pressure and the inner rings to be compressed slightly by external pressure, or the rings can be split for this purpose.

When the sleeve is tightened on the threaded end of the drive shaft, the pressure of shoulder 12 against the adjoining ring 14 moves it inwardly along the shaft and this pushes the other ring 13 in the same pair inwardly also, with the result that the next pair of rings are pushed inwardly. This continues inwardly along the shaft until the rings in each pair have been wedged together, so all of the outer rings are expanded into tight engagement with the surrounding sleeve by means of the wedging action of the inner rings, and the inner rings are compressed tightly onto the shaft. The sleeve is screwed onto the drive shaft until the coupling rings engage the drive shaft and sleeve tightly enough to frictionally connect the sleeve and shaft together during normal operation of the machine.

Instead of a series of coupling rings, it is possible to use only one pair of long concentric rings having tapered engaging surfaces.

Figure 3:
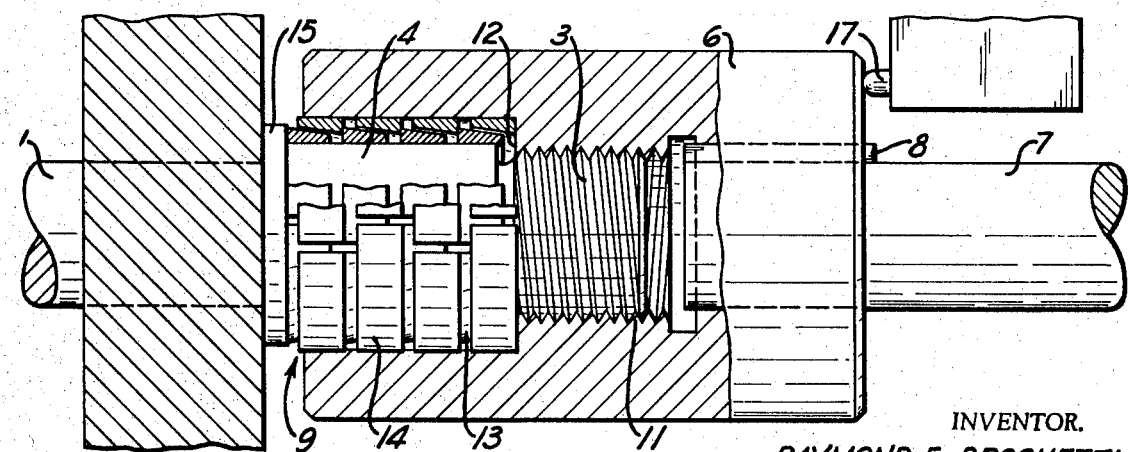
FIG. 3 is a view similar to FIG. 1, but showing the coupling after the drive shaft has been unloaded and stopped.

It is a feature of this invention that if the driven shaft 7 is unable to turn, due to stalling caused by an overload or the like, whereby sleeve 6 will be stalled also, the drive shaft 1 will automatically be unloaded so that neither its drive nor any of the connected operating parts will be damaged. This automatic unloading is accomplished by having the screw threads 3 on the outer end of the drive shaft extend around the shaft in the same direction that it rotates. By this is meant that if the drive shaft is rotating in a clockwise direction, for example, when viewed from its outer end, then the screw threads extend in such a direction that the sleeve must be turned in a clockwise direction in order to screw it onto the shaft. With this arrangement, if the sleeve is stalled, the torque on the drive shaft will increase to the point where the shaft will start to slip in the friction coupling 9. Since the threaded means 11 is integrally connected with the sleeve, the threaded means will remain stationary too and therefore the shaft will start to unscrew itself from the central portion of the sleeve. This will cause the sleeve to move axially along the driven shaft 7 away from the drive shaft, as shown in FIG. 3. The moment this occurs, the pressure of sleeve shoulder 12 against the coupling rings is relieved so that inner rings can expand and the outer rings can contract, which reduces or releases the frictional engagement of the friction coupling with the shaft and sleeve. The drive shaft then can turn in the stationary sleeve more or less freely without damage.

As a further precaution, it is desirable to shut off the motor that drives the drive shaft as soon as possible. This can be accomplished by the axially moving sleeve. Thus, when the sleeve moves away from the drive shaft, it immediately engages and actuates a sensitive electric switch 17 that will shut off the power to the drive shaft.

As indicated above, there is an advantage in not having the threaded means that presses against the friction coupling integral with the driven member, in order to avoid relative rotation between the driven member and friction coupling, or between the friction coupling and drive shaft, when the threaded means is being screwed onto the drive shaft. Therefore, in the modification shown in FIGS. 4 and 5 the threaded means is a nut 20 that is separate from the driven member, which may be a hollow hub 21 rigidly mounted on a shaft 22 that it turns. The nut is screwed onto the threaded portion 23 of a drive shaft 24, which has a smooth cylindrical portion 26 extending into the hub in spaced relation with the encircling wall facing it. The end of the drive shaft is encircled by a collar 27. Between this collar and the nut there is a friction coupling 28, which may take the same form as the one shown in FIG. 1. By screwing the nut up tightly against the coupling, the coupling is forced to expand against the encircling hub and contract against the drive shaft, thereby operatively connecting the shaft to the hub.

In order to unload the drive shaft in case the hub is stalled, the nut must move away from the hub to release its axial pressure on the friction coupling, but for the nut to move axially, the drive shaft must turn in it. That means that the nut must be held stationary temporarily. This is insured, in accordance with this invention, by a resilient friction ring 30 compressed between the opposed faces of the nut and hub. The ring can be solid as shown, or it can be a rubber tube that is inflated after nut 20 is tightened. This ring does not interfere with turning of the nut inwardly toward the hub to tighten the friction coupling, but, when the hub stalls, the friction ring does keep the nut from turning with the drive shaft until the nut has backed away from the hub far enough to release the friction coupling. Expansion of the friction ring axially causes it to follow the nut and keep it from turning until the friction between the ring and nut becomes less than the friction between nut and shaft. By that time the friction coupling has been released and the nut has engaged and tripped an electric switch 31, as indicated in dotted lines in FIG. 4, to shut off the power to the drive shaft. The friction ring 30 can be secured to either the nut or the hub, but preferably to the hub. One way of fastening them together is to mount one end of the ring in an annular groove 32 in the end face of the hub.

Figure 6:
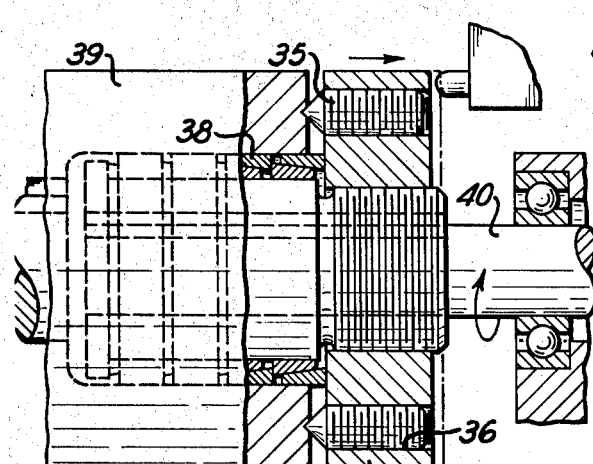
FIG. 6 is a fragmentary side view, partly in section, of a further modification of the invention.

Instead of using a friction ring to hold the nut stationary for a moment, pointed set screws 35 may be mounted in parallel threaded passages 36 in a nut 37, as shown in FIG. 6. After the nut has been tightened against the adjoining friction coupling 38 the necessary amount, with the setscrews retracted, the screws are turned inwardly to press their pointed ends tightly against the end face of the adjoining hub 39. The pressure and friction thus produced will keep the nut from turning with the drive shaft 40, if the hub is stalled, until the nut backs away enough to release the friction coupling sufficiently to permit the drive shaft to turn in the hub without doing any damage.

Figure 4:
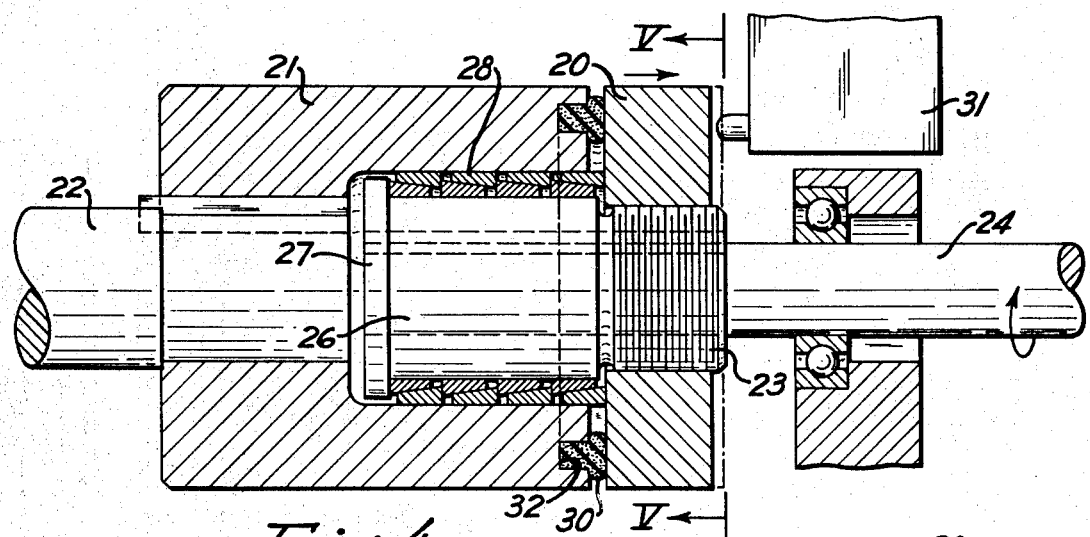
FIG. 4 is a longitudinal section through a modified unloading coupling.
Figure 5:
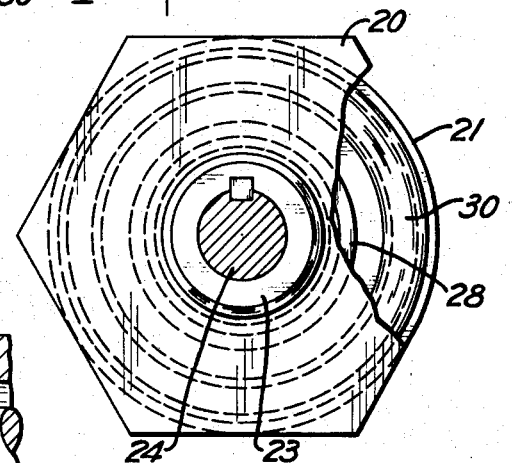
FIG. 5 is a cross section taken on the line V–V of FIG. 4.
Figure 7:
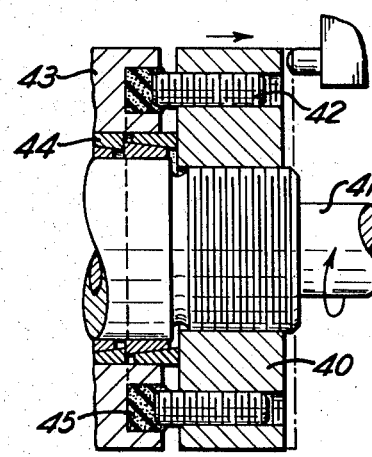
FIG. 7 is a fragmentary longitudinal section of another embodiment.

The embodiment of the invention shown in FIG. 7 amounts to a combination of FIGS. 4 and 6. The nut 40, screwed onto a drive shaft 41, is provided with set screws 42 that are turned toward the hub 43 of the driven means after the nut has tightened the friction coupling 44 into tight engagement with the drive shaft and hub. However, instead of directly engaging the end of the hub, the setscrews press tightly against a compressible friction ring 45 mounted in the hub. Due to the expansion of the ring as the nut backs away from the hub if the hub is stalled, the nut will be prevented from rotating for a longer period than if the screws engaged the hard end face of the hub.

Figure 8:
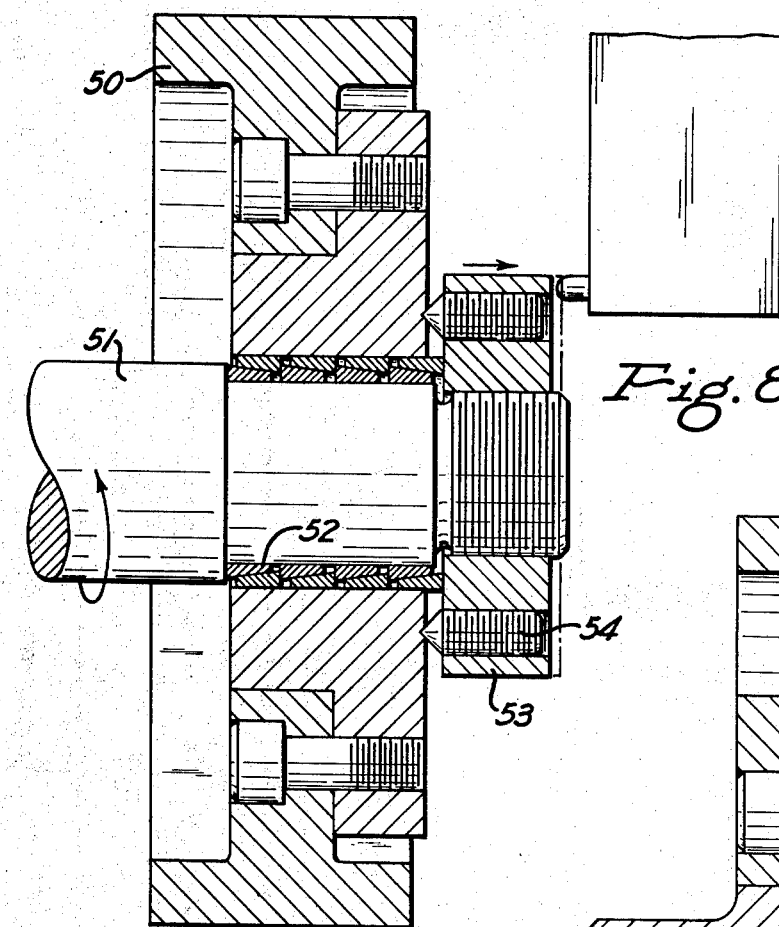
FIGS. 8 and 9 are longitudinal sections through two more modifications of the invention.

In the modification shown in FIG. 8, the driven member 50 is a pulley or gear that encircles a drive shaft 51. Between the two there is a friction coupling 52 that is compressed axially by a nut 53 screwed onto the outer end of the drive shaft. The nut is provided with pointed setscrews 54 that are tightened into the outer face of the driven member after the nut has tightened the friction coupling. The screws restrain the nut from turning with the drive shaft in case the driven member is stalled.

Figure 9:
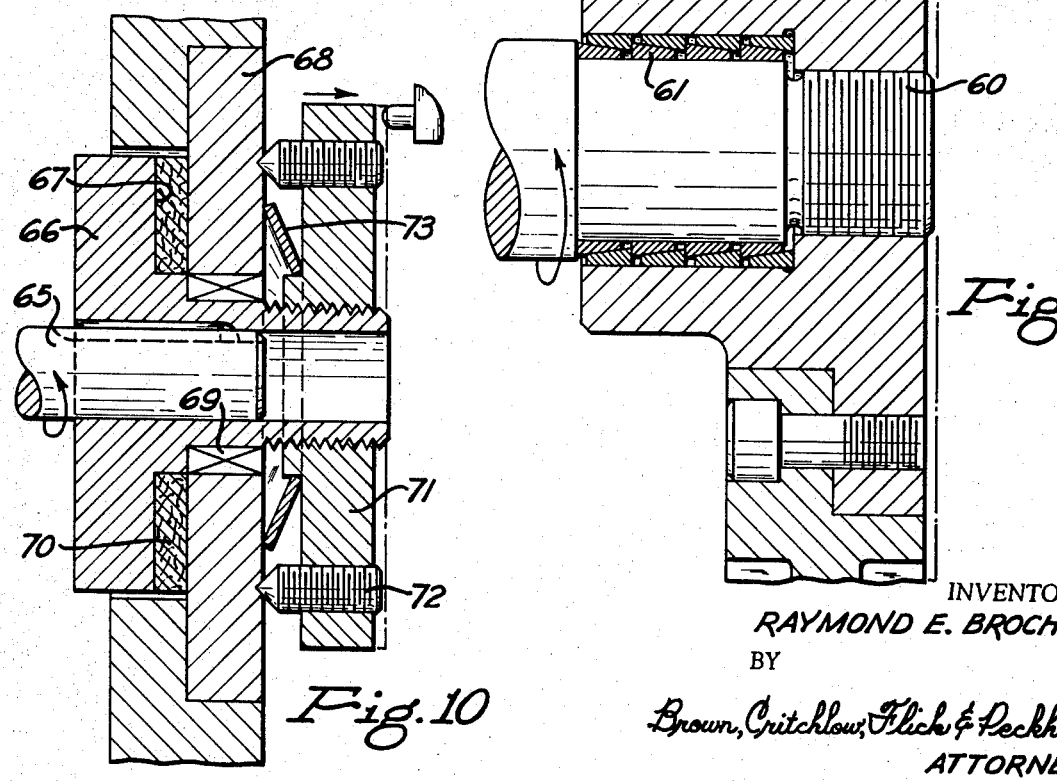

The embodiment of the invention shown in FIG. 9 is similar to the one in FIG. 1 because the threaded means 60 that tightens the friction coupling 61 in the hub 62 of the pulley or gear 63 is integral with the hub and therefore must turn or stall with it. In case of stalling, the friction coupling is released in the same way as in FIG. 3.

Figure 10:
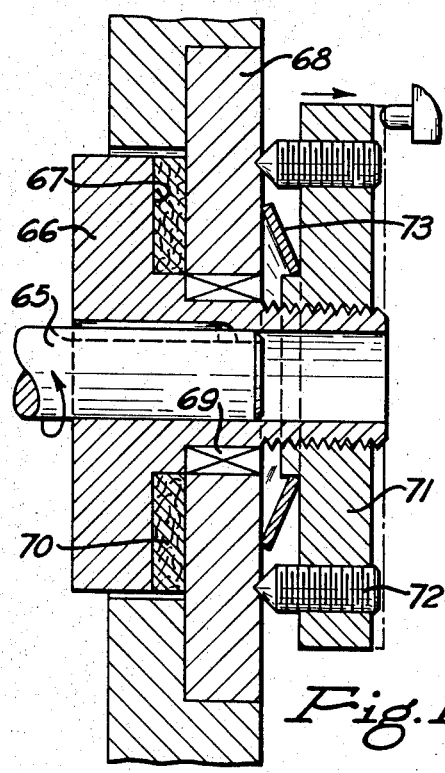
FIG. 10 is a fragmentary side view, partly in section, of another form of the invention.

In the embodiment shown in FIG. 10, the drive member is formed from a drive shaft 65 with a driving member 66 keyed on its end. The outer end of this member is screw threaded, but the inner end is provided with a radial flange having a smooth surface 67 facing the threaded end. Spaced from that surface is the driven member 68, which may be a sprocket mounted on a bearing 69. Between the smooth surface and the driven member surface facing it, there is a friction coupling 70 in the form of an annular member, such as a disk with friction surfaces and a central opening. Screwed onto the end of the driving member is a nut 71 provided with circumferentially spaced setscrews 72 that tightly engage the outer face of the driven member. These screws could press the driven member against the friction coupling tightly enough to cause the drive shaft to drive the driven member. However, it is better to insert a stiff spring 73, such as a Belleville spring, between the nut and driven member so that, with the setscrews retracted, the nut can be tightened until the spring presses the driven member against the friction coupling with enough force to operatively connect the driven member with the drive shaft. Then the setscrews can be tightened against the driven member so that the nut will be sure to remain stationary for a moment if the driven member stops and the drive shaft continues to turn. That will back off the nut and release the friction coupling so that the driving member will be free to rotate relative to the driven member.

I claim:

1. An automatic unloading coupling comprising a drive member rotatable in a predetermined direction and having a screw-threaded portion and an adjacent unthreaded surface, a driven member having a surface facing said unthreaded surface in spaced relation therewith, friction coupling means between said surfaces in engagement with both, said means being formed to exert pressure against said surfaces when pressure is applied axially of said means, and a nut screwed onto said threaded portion of the drive member in the direction of rotation of that member, said nut normally exerting sufficient pressure toward said coupling means axially thereof to force the latter into tight enough engagement with the drive member and driven member to frictionally connect them as long as the driven member is not stalled by an overload, and connecting means carried by the nut and movable relative thereto into engagement with said driven member to stop rotation of the nut temporarily if the driven member is stalled, whereby the drive member will start to turn in the nut to back the latter in a direction away from said coupling means and thereby release the axial pressure on the coupling means.

2. An automatic unloading coupling according to claim 1, in which said driven member and threaded means are integral with each other.

3. An automatic unloading coupling according to claim 1, in which said frictional connecting means includes a resilient friction ring compressed between said nut and driven member.

4. An automatic unloading coupling according to claim 3, in which said ring is secured to the driven member.

5. An automatic unloading coupling according to claim 1, in which said connecting means include setscrews carried by said nut and projecting therefrom into tight engagement with the adjoining end of the driven member.

6. An automatic unloading coupling according to claim 1, in which said frictional connecting means include a resilient friction ring secured to the driven member opposite said nut, and setscrews carried by the nut and projecting therefrom into engagement with said ring.

7. An automatic unloading coupling according to claim 1, in which said facing surfaces are spaced axially, and said friction coupling means is an annular member sandwiched between them.

8. An automatic unloading coupling comprising a drive member rotatable in a predetermined direction and having a screw-threaded portion and an adjacent unthreaded cylindrical surface, a driven member having a cylindrical surface concentric with the other cylindrical surface in spaced relation therewith, friction coupling means between said surfaces in engagement with both, said means being formed to exert pressure radially inward and outward against said surfaces when pressure is applied axially to one end of said coupling means, and threaded means screwed onto said threaded portion of the drive member in the direction of rotation of that member, said threaded means normally exerting sufficient pressure against said one end of the coupling means axially thereof to force the latter into tight enough engagement with the drive member and driven member to frictionally connect them as long as the driven member is not stalled by an overload, and said driven member being connected with said threaded means to stop rotation of the latter at least temporarily if the driven member is stalled, whereby the drive member will start to turn in the threaded means to back the latter in a direction away from said coupling means and thereby release the axial pressure on the coupling means.

9. An automatic unloading coupling according to claim 8, in which said driven member and threaded means are a single sleeve provided with internal screw threads around the threaded portion of the drive member.

10. An automatic unloading coupling according to claim 9, in which said friction coupling means include a pair of engaging concentric expandable wedge rings having engaging surfaces tapered axially thereof, and said threaded means presses against the thick end of one of the rings.